No. 681,550. Patented Aug. 27, 1901.
L. DE W. HOWARD.
HORSE DETACHER.
(Application filed Feb. 26, 1901.)
(No Model.)
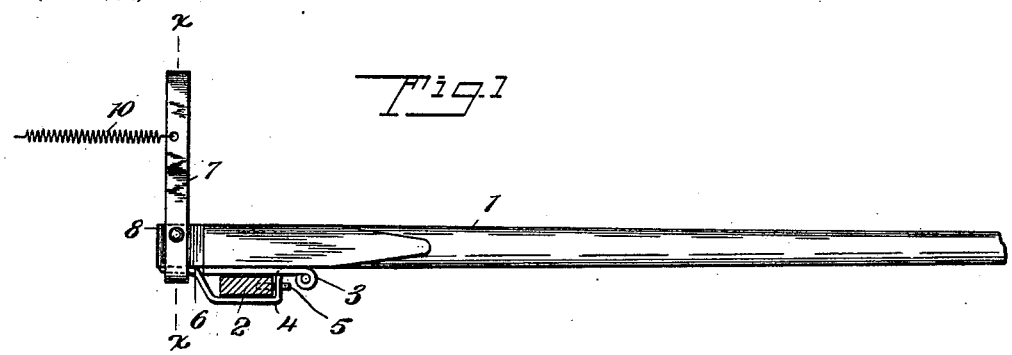
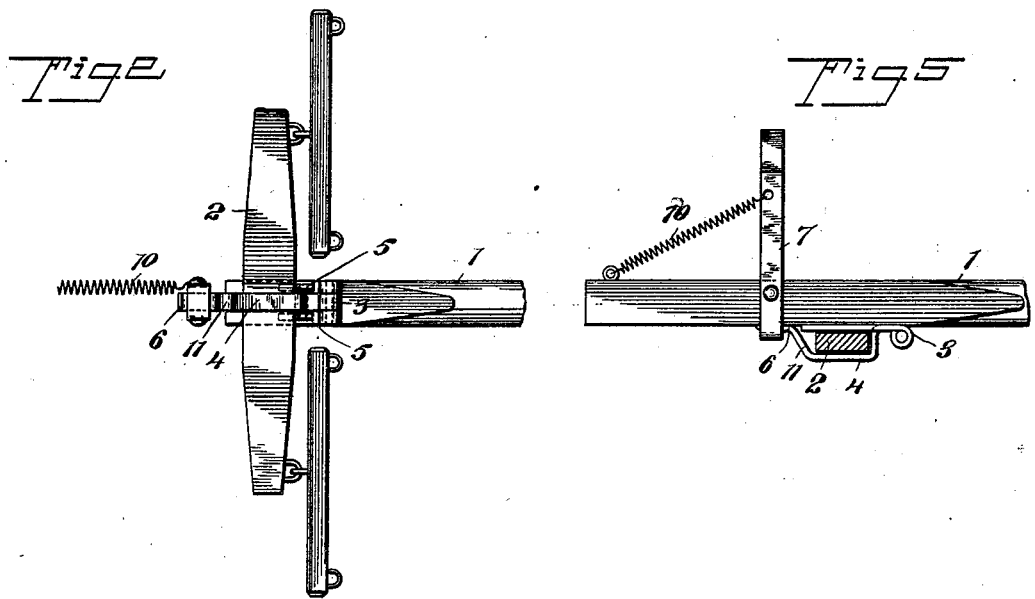
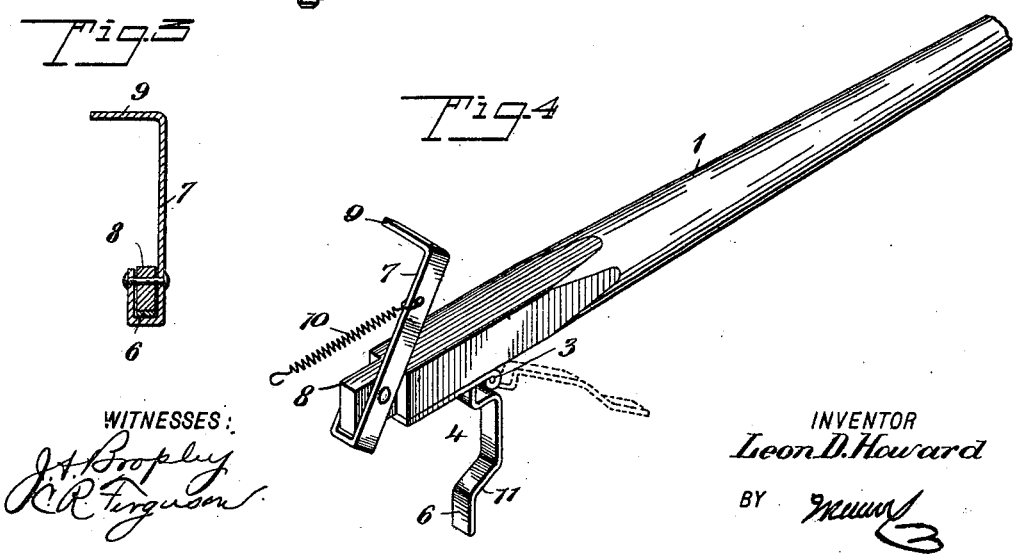
WITNESSES:
J. H. Bropley
K. R. Ferguson
INVENTOR
Leon D. Howard
BY
ATTORNEYS

UNITED STATES PATENT OFFICE.

LEON DE WITT HOWARD, OF BLUNT, SOUTH DAKOTA, ASSIGNOR OF ONE-HALF TO WILLIAM W. WAITE AND EDWIN F. WAITE, OF SAME PLACE.

HORSE-DETACHER.

SPECIFICATION forming part of Letters Patent No. 681,550, dated August 27, 1901.

Application filed February 26, 1901. Serial No. 48,895. (No model.)

*To all whom it may concern:*

Be it known that I, LEON DE WITT HOWARD, a citizen of the United States, and a resident of Blunt, in the county of Hughes and State of South Dakota, have invented a new and Improved Horse-Detacher, of which the following is a full, clear, and exact description.

This invention relates to improvements in devices for detaching horses from a vehicle in case of a runaway or for other reasons where the quick detaching of the horses is desirable; and the object is to provide a device of this character of simple construction that may be readily attached to any pole-vehicle, such as a wagon or farm-machine, and which may be operated by a person riding in or on the vehicle.

I will describe a horse-detacher embodying my invention and then point out the novel features in the appended claims.

Reference is to be had to the accompanying drawings, forming a part of this specification, in which similar characters of reference indicate corresponding parts in all the figures.

Figure 1 is a side view, partly in section, showing a device embodying my invention. Fig. 2 is a bottom plan view of the same. Fig. 3 is a section through the line *x x* of Fig. 1. Fig. 4 is a perspective view showing the position of parts upon releasing, and Fig. 5 is a side view showing a slight modification.

Referring to the drawings, 1 designates the pole or tongue of a vehicle, and 2 the evener, designed to be released from the pole or tongue should occasion require. Secured to the under side of the pole or tongue is a metal strap 3, and pivoted to the forward end of this strap 3 is a latch-strap 4, designed to engage with the evener, as plainly indicated in the drawings. To prevent a lengthwise movement of the evener, I provide it on its forward side with pins 5 for engaging the opposite sides of a downwardly-extended portion of the latch 4. The rear end of this latch is inclined upward at 11 and then extended outward, as at 6, to engage against the under side of the pole, and the latch is secured in its holding position by means of a lever 7, pivoted to a reduced portion 8 of the pole and having a part extended downward at one side of said reduced portion, thence across the reduced portion and below the extension 6 of the latch, and thence upward on the other side of the reduced portion. The upper end of the lever 7 is turned at right angles, as shown at 9, to form a foot-plate, and from the lever at a suitable point below the foot-plate a spring 10 extends to a fixed portion of the vehicle.

The construction shown in Fig. 5 is substantially the same as that above described; but in this modification the pole is extended somewhat rearward of the lever 7 and the spring 10 connects at one end with said lever and at the other end with an eye on the extended end of the pole.

Normally the parts will be held in position as indicated in Figs. 1, 2, and 5. Should it become necessary to release the horses, the driver by placing his foot on the plate 9 and by forcing the lever 7 forward will move said lever out of engagement with the extension 6 of the latch, permitting said latch to fall downward, releasing the evener. The inclined portion 11 of the latch will permit the evener to slide off easily.

It will be seen that a device embodying my invention may be readily applied to an ordinary pole, and it is to be understood that the latch mechanism may be arranged upon the upper side of the pole when it is desired to so place the evener.

Having thus described my invention, I claim as new and desire to secure by Letters Patent—

1. A horse-detacher, comprising a latch mounted to swing on the pole of a vehicle, a lever pivoted to the vehicle and adapted to engage with the free end of said latch to hold it in its closed position around the evener, and a spring extended from said lever to a fixed portion of the vehicle, substantially as specified.

2. A horse-detacher, comprising a plate secured to the under side of a vehicle-pole, a latch mounted to swing on said plate, an evener, projections on the forward side of said evener for engaging against opposite sides of the front portion of the latch, the said latch having its rear portion inclined upward and rearward and then extended outward, a lever pivoted to the pole and adapted to engage with said extended portion of the latch, and a spring for holding the said lever in its locking position, substantially as specified.

In testimony whereof I have signed my name to this specification in the presence of two subscribing witnesses.

LEON DE WITT HOWARD.

Witnesses:
JOHN F. GUNSALUS,
J. I. HOUTZ.